Patented June 30, 1953

2,644,015

UNITED STATES PATENT OFFICE 2,644,015

ALKALINE HYDROLYSIS OF HEXA-
CHLOROBENZENE

Paul D. Bartlett, Weston, Mass., assignor, by
mesne assignments, to Columbia-Southern
Chemical Corporation, Pittsburgh, Pa., a corporation of Delaware No Drawing. Application February 10, 1950,
Serial No. 143,605

9 Claims. (Cl. 260—623)

This invention relates to the alkaline hydrolysis of hexachlorobenzene to produce chlorophenols and particularly pentachlorophenol.

Several methods for the hydrolysis of chlorobenzenes to the corresponding phenols are known in the art. One such method accomplishes the hydrolysis by heating a chlorobenzene with an excess of alkali metal hydroxide, dissolved in or mixed with methyl alcohol at temperatures of 130° C. to 140° C. It has also been proposed that ethyl alcohol may be used as a diluent.

There are several objections to this method of production. For instance, when methyl or ethyl alcohol is used as a solvent in the production of pentachlorophenol by hydrolysis of hexachlorobenzene, objectionable by-products are formed which increase the problems of separation in obtaining the final product. Furthermore, considerable quantities of the alcohol are consumed by forming ethers and like compounds and the alcohol must be replaced by new supplies or reconverted from the by-product formed. It is not always possible to completely reconvert the by-product, therefore some of the alcohol is necessarily lost. The necessity of reconversion also is an additional step which economically affects the production of the phenol. Thus when methyl alcohol is employed it has been found that approximately one mole of dimethyl ether is formed for every mole of chlorobenzene that is hydrolyzed. Other alkoxy compounds are formed, such as the methyl ether of pentachlorophenol, or dihydroxy chlorobenzenes and methyl ethers thereof, which render separation difficult and provide an impure product.

In accordance with this invention a method of hydrolyzing hexachlorobenzene to pentachlorophenol or corresponding polyhydroxy chlorophenol has been discovered in which the phenol is obtained in a more pure state and in which the solvent is not consumed or converted to contaminating by-products, but may be easily removed unchanged from the reaction mixture. This may be achieved by conducting the alkaline hydrolysis of hexachlorobenzene in the presence of a tertiary liquid aliphatic alcohol containing up to 10 carbon atoms. When such a tertiary alcohol is employed, there is no ether compound or other alkoxy compound formed in the process and a more pure product is produced. The tertiary alcohol may be easily and completely separated from the reaction mixture upon completion of the reaction.

Various tertiary aliphatic alcohols which are liquid at the temperature of hydrolysis are suitable for use in the practice of the invention. Especially valuable for this purpose are tertiary butyl alcohol and tertiary amyl alcohols. However other tertiary alcohols including diethyl methyl carbinol, dimethyl propenyl carbinol, dimethyl propyl carbinol, dimethyl isopropyl carbinol, allyl dimethyl carbinol, isobutyl dimethyl carbinol, butyl dimethyl carbinol, tertiary butyl dimethyl carbinol, ethynyl methyl propyl carbinol, ethynyl isopropyl methyl carbinol, ethyl methyl propyl carbinol, ethyl isopropyl methyl carbinol, triethyl carbinol, diethyl propyl carbinol, diethyl isopropyl carbinol, butyl ethyl methyl carbinol, amyl dimethyl carbinol, allyl methyl propyl carbinol, allyl diethyl carbinol, pinacol, and other tertiary liquid aliphatic alcohols containing up to 10 carbon atoms may be used. It is preferable that the tertiary alcohol employed have a low boiling point ni order to facilitate its separation from the final reaction mixture. It is also necessary that the tertiary alcohol employed does not decompose at or near the temperature of reaction. Tertiary alcohols having boiling points as high as about 165° C. are preferable for the reaction.

It is conventional to perform the hydrolysis with an excess, for example 2–4 moles per mole of hexachlorobenzene hydrolyzed, of an alkaline compound, such as sodium hydroxide. Other alkali metal hydroxides, such as lithium hydroxide, potassium hydroxide, rubidium hydroxide and cesium hydroxide, and alkaline earth metal hydroxides such as calcium hydroxide, strontium hydroxide and barium hydroxide or organic bases may be employed in lieu of or in combination with sodium hydroxide.

In performance of the process herein contemplated, a tertiary alcohol, such as tertiary butyl alcohol, is mixed with the hexachlorobenzene and alkaline compound and the mixture is heated in a closed vessel for several hours. While the heating may be conducted under a reflux condenser, and at atmospheric pressure, the process generally is conducted at superatmospheric pressure, for example under the autogenous pressure of the system. The quantity of tertiary alcohol employed for the reaction is usually from 10 to 30 moles per mole of chlorobenzene hydrolyzed, approximately 18 to 22 moles of tertiary butyl alcohol giving optimum results in the hydrolysis of hexachlorobenzene to form pentachlorophenol. In a typical embodiment of the invention, the reaction mixture is heated at a temperature ranging from 130–140° C. for a period of from 2 to 3 hours. However the time and temperature of the reaction will vary depending upon the number of chlorine atoms to be hydrolyzed. In general, temperatures of from 100 to 200° C. may be employed for periods of time up to 20 or more hours. Temperatures higher than 170° will cause hydrolysis of more than one of the chlorine atoms. When the reaction is completed, the tertiary alcohol is distilled off and the reaction products are filtered to remove the alkali insolubles. The filtrate is then acidified with an inorganic acid and digested on a steam bath for several hours. The pentachlorophenol precipitates from the solution and is filtered therefrom. The product thus obtained is of high purity.

According to a further embodiment of applicant's invention, decachlorodiphenyl may be hydrolyzed to 4,4 dihydroxyoctachlorodiphenyl under the same conditions as prescribed above in the alkaline hydrolysis of hexachlorobenzene and in the same manner as set forth in the following example:

Example

Fifty-nine grams (0.21 mole) of hexachlorobenzene, twenty-two and seven-tenths grams (0.57 mole) of sodium hydroxide pellets and three hundred eleven and five-tenths grams (400 milliliters) of tertiary-butyl alcohol were placed in an autoclave. After these materials had been charged to the reactor, it was closed and heating and agitation of the reactants was started. The reaction mass was heated to a temperature of 135° C. and maintained at such temperature for a period of 2 hours. The pressure in the reactor during this time was approximately 70 pounds per square inch. The reaction mass was then allowed to cool to a temperature below the boiling point of tertiary butyl alcohol (83° C.) whereupon the reactor was vented through a gas collecting and condensing system (Dry Ice-acetone cooled traps) to collect any gaseous by-products formed during the reaction. After venting, the reaction mass was heated to a temperature just above the boiling point of tertiary-butyl alcohol. No by-product vaporized and distilled over, as occurred in a similar experiment in which methanol was employed in place of the tertiary-butyl alcohol. The reactor contents were then cooled to approximately 23° C., the reactor opened, and the remaining reaction products washed with 500 cubic centimeters of water, the temperature of the wash water being about 15° C. The reactor contents were emptied into a distillation flask and the reactor was washed with 500 cubic centimeters of water, this wash water then being added to the contents of the distillation flask. The tertiary butanol was distilled off. The reaction products were cooled to room temperature and filtered to remove the alkali insolubles. The filtrate was then acidified with a 40 percent aqueous solution of sulphuric acid to a pH of approximately 1.5, digested on a steam bath for several hours and then filtered to remove the precipitated product. After the filter cake had been washed with hot water (until no NaCl remained in the washings, as was indicated by an $AgNO_3$ test), it was dried at 65° C. until its weight remained constant. A yield of 71 percent pentachlorophenol was obtained, the pentachlorophenol having a melting range of 187–190° C. and a purity (based upon acid equivalents) of 99.9 percent.

Although the present invention has been described with reference to specific details of certain embodiments thereof, it is not intended that such details shall be regarded as limitations upon the scope of the invention except insofar as included in the accompanying claims.

I claim:
1. In the production of a phenol by the alkaline hydrolysis of hexachlorobenzene, the step which comprises carrying out the reaction in the presence of a liquid, aliphatic, tertiary alcohol containing up to 10 carbon atoms at a reaction temperature at which the alcohol does not decompose.

2. A method of producing a phenol which comprises hydrolyzing hexachlorobenzene in the presence of an alkaline hydroxide and a tertiary liquid aliphatic alcohol containing up to 10 carbon atoms at a reaction temperature at which the alcohol does not decompose.

3. In the production of pentachlorophenol by the alkaline hydrolysis of hexachlorobenzene, the step which comprises carrying out the reaction in the presence of a liquid, aliphatic, tertiary alcohol containing up to 10 carbon atoms at a reaction temperature at which the alcohol does not decompose.

4. In the production of pentachlorophenol by the alkaline hydrolysis of hexachlorobenzene, the step which comprises carrying out the hydrolysis of one mole of hexachlorobenzene in the presence of from 18 to 22 moles of a liquid aliphatic tertiary alcohol containing up to 10 carbon atoms at a reaction temperature at which the alcohol does not decompose.

5. In the production of pentachlorophenol by the alkaline hydrolysis of hexachlorobenzene, the step which comprises performing the reaction in the presence of tertiary butyl alcohol at a reaction temperature at which the alcohol does not decompose.

6. In the production of pentachlorophenol by the alkaline hydrolysis of hexachlorobenzene, the step which comprises performing the reaction in the presence of tertiary amyl alcohol at a reaction temperature at which the alcohol does not decompose.

7. A method of producing pentachlorophenol which comprises hydrolyzing hexachlorobenzene in the presence of sodium hydroxide and tertiary butyl alcohol at a reaction temperature at which the alcohol does not decompose.

8. A method of producing a phenol by alkaline hydrolysis of hexachlorobenzene, the step which comprises carrying out the hydrolysis of one mole of hexachlorobenzene in the presence of from 18 to 22 moles of a liquid aliphatic tertiary alcohol containing up to 10 carbon atoms at a temperature of from 100 to 200° centigrade and at which the alcohol does not decompose.

9. In the production of pentachlorophenol by the alkaline hydrolysis of hexachlorobenzene, the step which comprises carrying out the hydrolysis of one mole of hexachlorobenzene in the presence of from 18 to 22 moles of a liquid aliphatic tertiary alcohol containing up to 10 carbon atoms at a temperature of from 100 to 170° centigrade and at which the alcohol does not decompose.

PAUL D. BARTLETT.

References Cited in the file of this patent

UNITED STATES PATENTS

| Number | Name | Date |
|---|---|---|
| 2,107,650 | Smith et al. | Feb. 8, 1938 |
| 2,509,245 | Nikawitz | May 30, 1950 |